United States Patent [19]

Kohno et al.

[11] Patent Number: 4,624,403
[45] Date of Patent: Nov. 25, 1986

[54] METHOD FOR BONDING CERAMICS TO METALS

[75] Inventors: Akiomi Kohno, Ibaraki; Susumu Hioki, Kashiwa; Toshihiro Yamada, Ibaraki; Kazuaki Yokoi, Ibaraki; Akihiko Yamamoto, Ibaraki, all of Japan

[73] Assignee: Hitachi, Ltd., Tokyo, Japan

[21] Appl. No.: 681,253

[22] Filed: Dec. 13, 1984

[30] Foreign Application Priority Data

Dec. 14, 1983 [JP] Japan ................. 58-234216

[51] Int. Cl.⁴ ............................................. B23K 20/22
[52] U.S. Cl. ................... 228/122; 228/194; 228/263.12; 228/234
[58] Field of Search .......... 228/122, 123, 194, 263.12, 228/234

[56] References Cited

U.S. PATENT DOCUMENTS

| 3,153,581 | 10/1964 | Hutchins | 228/122 |
| 3,284,176 | 11/1966 | Reed | 228/122 |
| 3,382,052 | 5/1968 | Clarke | 228/122 |
| 3,482,726 | 12/1969 | Schroeder | 228/122 |
| 3,599,316 | 8/1971 | Moskal | 228/263.12 |
| 3,736,658 | 6/1973 | Weaver | 228/122 |
| 3,915,369 | 10/1975 | Schmidt-Bruecken | 228/194 |
| 4,075,364 | 2/1978 | Panzera | 228/122 |
| 4,444,352 | 4/1984 | Glascock | 228/234 |

FOREIGN PATENT DOCUMENTS

| 0125673 | 7/1983 | Japan | 228/194 |
| 0135180 | 8/1983 | Japan | 228/122 |

Primary Examiner—Kenneth J. Ramsey
Assistant Examiner—Christopher L. McKee
Attorney, Agent, or Firm—Antonelli, Terry & Wands

[57] ABSTRACT

The present invention relates to a method for bonding a non-oxide ceramic to a metal through an intermediate material comprising at least one member selected from metals of the Groups VIa and VIII of the Periodic Table. This method is suitably used for bonding of a structural part of a machine, an electronic part and the like.

4 Claims, 3 Drawing Figures

4,624,403

METHOD FOR BONDING CERAMICS TO METALS

BACKGROUND OF THE INVENTION

1. Field of the Invention

The present invention relates to a method for bonding a non-oxide ceramic to a metal. More particularly, the present invention relates to a method for bonding a non-oxide ceramic to a metal, which is suitably used for bonding of a structural part of a machine, an electronic part and the like.

2. Description of the Prior Art

A method for bonding SiC, one of non-oxide ceramics, to a metal is disclosed in Nikkei Mechanical (published on July 4, 1983). According to this bonding method, a metal foil is inserted between SiC and a metal, the assembly is heated under pressure until the metal foil is fused, and the metal foil is diffused and infiltrated in the bonding interface between SiC and the metal to bond SiC to the metal. However, if heating is effected for bonding until the metal foil is fused, for the reasons described below, the strength of the bonded portion is reduced or cracks are readily formed in SiC.

(1) Since the metal foil is fused, the reaction of the metal foil with SiC becomes violent, and a silicide having a larger thermal expansion coefficient than that of SiC is formed in the interface between the metal and SiC. Accordingly, at the cooling step after the bonding operation, a large heat stress is generated because of the difference in thermal expansion among SiC, the silicide layer and the bonded metal.

(2) Since the solidification temperature of the fused metal foil is high and the difference between this solidification temperature and room temperature is very large, the heat stress is prominently increased.

OBJECT OF THE INVENTION

It is a primary object of the present invention to provide a method for bonding a non-oxide ceramic to a metal, in which the non-oxide ceramic is tightly bonded to the metal, the heat stress generated because of the difference in thermal expansion between the ceramic and the metal is reduced to a minimum level and formation of cracks on the ceramic is completely prevented.

SUMMARY OF THE INVENTION

We have found that a metal of the Group VIb or VIII of the Periodic Table can react with a non-oxide ceramic at a relatively low temperature to form a silicide. We have now completed the present invention based on this finding. More specifically, in accordance with the present invention, there is provided a method for bonding a non-oxide ceramic to a metal, which comprises bonding an intermediate material comprising at least one member selected from metals of the Groups VIb and VIII of the Periodic Table to the metal by diffusion bonding, abutting the intermediate material against the non-oxide ceramic and heating the assembly under pressure at a temperature lower than the fusing temperature of the intermediate material.

DETAILED DESCRIPTION OF THE INVENTION

The present invention will now be described in detail with reference to the following examples. [Bonding of SiC to Steel]

EXAMPLE 1

Figure 1:
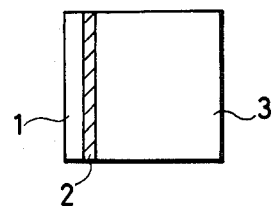
FIGS. 1 and 2 are diagrams illustrating SiC and steel bonded according to the bonding method of the present invention.

As shown in FIG. 1, to a Cr-Mo steel test piece 1 (having a thickness of 0.6 mm) is diffusion-bonded to an intermediate material 2 of Fe-29%Ni-17%Co alloy (having a thickness of 0.3 mm) (the bonding temperature is 1000° C., the bonding pressure is 1.5 Kgf/mm$^2$ and the bonding time is 30 minutes). The intermediate material 2 is abutted against an SiC test piece 3 (10 mm×10 mm×10 mm), and in a vacuum atmosphere ($10^{-4}$ Torr), the assembly is maintained at a bonding temperature of 700° C. and a bonding pressure of 2 Kgf/mm$^2$ for 2 hours. In this case, when SiC is contacted with the Fe-29%Ni-17%Co alloy in a heated and compressed state, Fe, Ni and Co are diffused in SiC and reacted with SiC, and silicides and Si reaction products such as $CoSiO_4$, $Co_2SiO_4$, $Ni_2Si$ and $Co_2Si$ are formed in the bonding interface, whereby SiC is bonded to the Fe-29%Ni-17%Co alloy. Namely, bonding of the test pieces 1 and 3 is effected. In the so-bonded test pieces 1 and 3, since the bonding temperature is low, the reaction of SiC with the Fe-29%Ni-17%Co alloy is controlled, and the reaction quantity is limited by the bonding time. Accordingly, the thickness of the above-mentioned reaction product layer is not increased (too large a thickness is not preferred). Moreover, since the difference in the temperature between heating and cooling (room temperature) is small and the heat stress is reduced, no formation of cracks is observed in SiC and the silicide layer.

EXAMPLE 2

Figure 2:
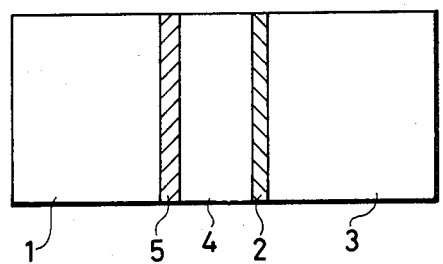

In this example, as shown in FIG. 2, when a Cr-Mo steel test piece 1 (having a thickness of 40 mm) is bonded to an SiC test piece 3 (10 mm×10 mm×10 mm) through an intemediate material 2 of Fe-29%Ni-17%Co alloy (having a thickness of 0.3 mm), a sheet 4 of WC-6%Co cemented carbide (having a thickness of 3 mm) is diffusion-bonded to the test piece 1 through a sheet 5 of Fe-40%Ni alloy (having a thickness of 0.5 mm) and the intermediate material 2 is diffusion bonded to the sheet 4. These diffusion bonding operations are carried out at a bonding temperature of 1000° C. under a bonding pressure of 1.5 Kgf/mm$^2$ for a bonding time of 30 minutes. Then, as shown in FIG. 2, the intermediate material 2 is abutted against the test piece 3, and in a vacuum atmosphere ($10^{-4}$ Torr), the assembly is maintained at a bonding temperature of 700° C. under a bonding pressure of 2 Kgf/mm$^2$ for 2 hours. Bonding of the intermediate material 2 to the test piece 3 is effected according to the bonding mechanism described in Example 1. In this example, the sheet 4 of a low thermal expansion coefficient interposed between the intermediate material 2 and the test piece 1 moderates the heat stress between test pieces 1 and 3 as well as the heat stress generated because of the difference in thermal expansion between the test piece 1 and the intermediate material 2 during the cooling step after the bonding operation. Accordingly, in the so bonded test pieces 1 and 3, formation of cracks is not observed in SiC and the silicide layer, and a torsional torque higher than 300 Kg.cm is obtained.

In Examples 1 and 2, it is confirmed that excellent effects similar to the above-mentioned can be obtained when alloys in which Ti, Nb, Zr, Al, Mo or W is incorporated so as to improve the heat resistance of the bonded portion, such as Ni-22%Cr-9%Mo-4%Nb-3%Fe alloy and Ni-14%Cr-9.5%Co-4%Mo-4%W-5%Ti-3%Al alloy, are used as the intermediate material 2. Furthermore, the heat stress can be moderated when a material of a low thermal expansion coefficient, such as Mo or W, is used instead of the WC-Co cemented carbide interposed between the intermediate material 2 and the test piece 1. [Bonding of $Si_3N_4$ to Steel]

EXAMPLE 3

Figure 3:
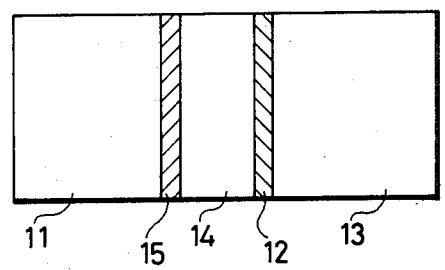
FIG. 3 is a diagram illustrating $Si_3N_4$ and steel bonded according to the bonding method of the present invention.

In this example, as shown in FIG. 3, when a Cr-Mo steel test piece 11 (having a thickness of 40 mm) is bonded to an $Si_3N_4$ test piece 13 (having a thickness of 40 mm) through an intermediate material 12 of Fe-18%Cr8%Ni alloy (having a thickness of 0.5 mm), a sheet 14 of WC-6%Co cemented carbide (having a thickness of 3 mm) is diffusion-bonded to the test piece 11 through a sheet 15 of Fe-29%Ni-17%Co alloy (having a thickness of 0.5 mm), and the intermediate material 12 is diffusion-bonded to the sheet 14. Then, as shown in FIG. 3, the intermediate material 12 is abutted against the test piece 13, and in a vacuum atmosphere ($10^{-4}$ Torr), the assembly is maintained at a bonding temperature of 1050° C. under a bonding pressure of 1.5 $Kgf/mm^2$ for 2 hours. Then, the temperature was lowered to 700° C., and at this temperature, the compression force is increased to 5 $Kgf/mm^2$ and the assembly is maintained at this temperature under this pressure for 1 hour. Then, the assembly is cooled to room temperature. In this case, by bonding of $Si_3N_4$ to the intermediate material 12, various metal silicides such as those formed in case of SiC are formed in the bonding interface, and these reaction products participate in bonding. Although it is considered that C is diffused in the metals, in case of an intermediate material having Ti or Nb incorporated therein, C is precipitated in the form of a carbide such as TiC or NbC.

In this example, since the bonding temperature is at a relatively high point of 1050° C., bonding of $Si_3N_4$ to steel can be accomplished by one treatment. Furthermore, since the assembly is not directly cooled to room temperature after the bonding operation but the assembly is once maintained at 700° C. under a constant pressure to cause plastic deformation in the intermediate material 12, the heat stress generated by the temperature difference between 1050° C. and 700° C. can be moderated, and substantially, only the heat stress generated by the temperature difference between 700° C. and room temperature is left. Moreover, if the compression force is increased in the above-mentioned step of maintaining the assembly at a constant temperature under a constant pressure, a lower temperature will suffice and the generated heat stress can be further decreased. Accordingly, in the so-bonded test pieces 11 and 13, no formation of cracks is observed in $Si_3N_4$ and the silicide layer, and a torsional torque higher than 360 Kg.cm is obtained.

In this example, it is confirmed that similar effects can be obtained when Ni-18%Fe-21%Cr-9%Mo alloy is used as the intermediate material 12.

In the foregoing examples directed to bonding of SiC or $Si_3N_4$ to steel, heating under pressure is carried out in a vacuum atmosphere. However, this bonding operation can also be carried out in an inert gas.

We claim:

1. A method for bonding a non-oxide ceramic to a metal which comprises bonding an intermediate material comprising at least one member selected from the group consisting of metals of the group VIb and VIII of the Periodic Table to the metal by diffusion bonding, abutting the intermediate material against the non-oxide ceramic and heating the resulting assembly under pressure at a temperature lower than the fusion temperature of the intermediate material to bond the assembly together and, thereafter, maintaining the bonded assembly at a constant temperature lower than the heating temperature under a constant pressure higher than the pressure applied in the heating step for a time sufficient to cause plastic deformation in the intermediate material.

2. A method for bonding a non-oxide ceramic to a metal according to claim 1, wherein said heating under pressure is carried out in a non-oxidizing or weakly oxidizing atmosphere.

3. A method for bonding a non-oxide ceramic to a metal according to claim 1, wherein an alloy comprising as main ingredients Fe, Ni and Co, an alloy comprising as main ingredients Fe, Ni and Cr or an alloy comprising Ni as a main ingredient is used as said intermediate material.

4. A method for bonding a non-oxide ceramic to a metal according to claim 3, wherein said intermediate material also contains at least one member selected from the group consisting of Ti, Nb, Zr, Al, Mo and W in addition to said main ingredients or main ingredient.

* * * * *